M. LUPORINI.
UNIVERSAL CLOCK.
APPLICATION FILED MAR. 20, 1912.
1,045,304.
Patented Nov. 26, 1912.
2 SHEETS—SHEET 1.
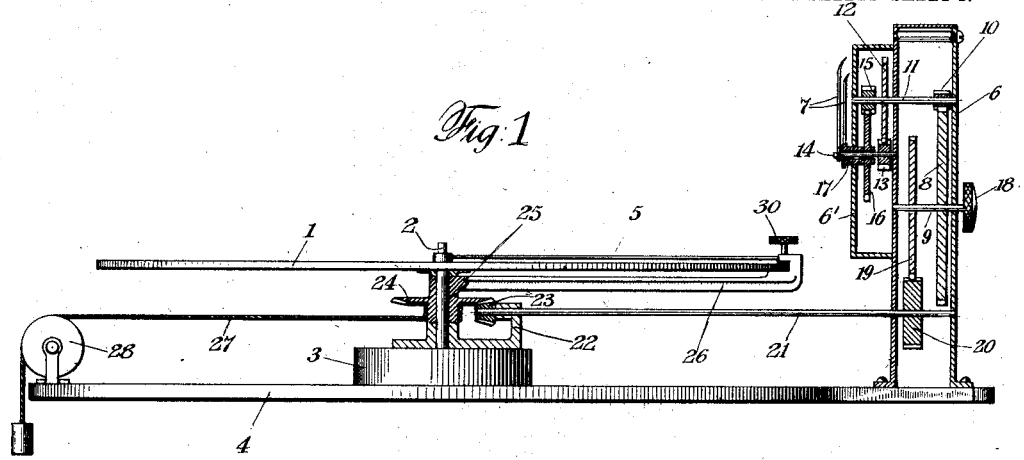
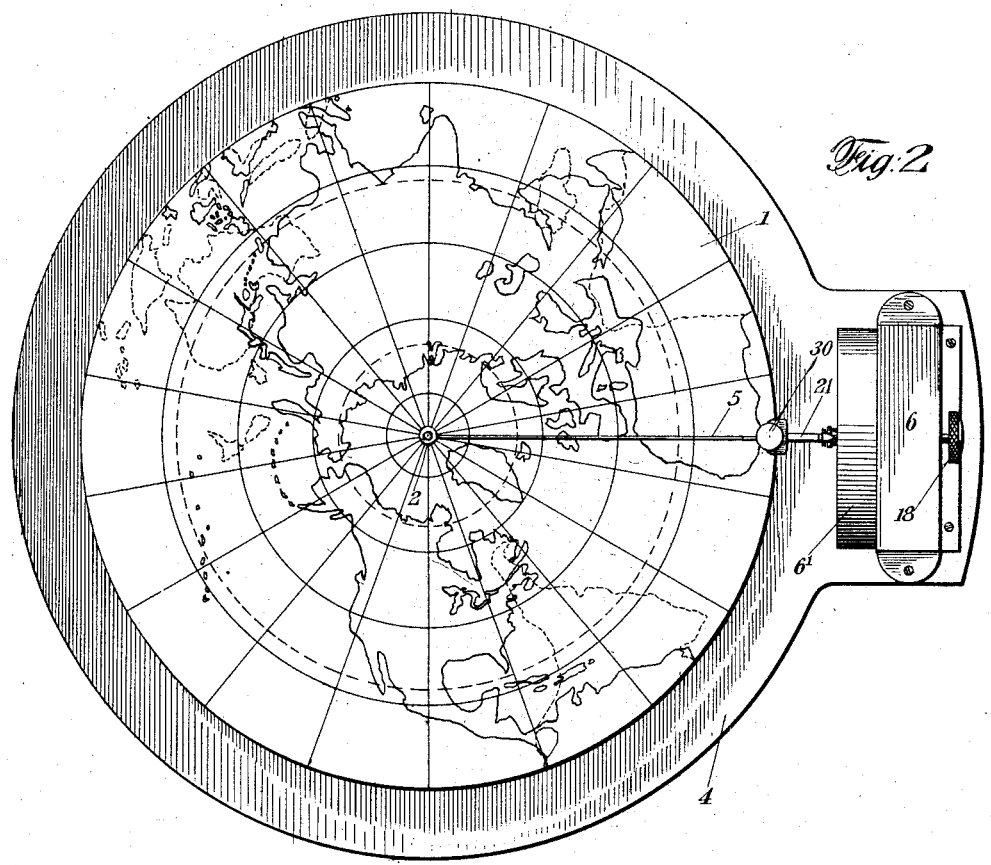
Witnesses:
Inventor
Mario Luporini
By his Attorney
Henry D. Williams M. LUPORINI.
UNIVERSAL CLOCK.
APPLICATION FILED MAR. 20, 1912.
1,045,304.
Patented Nov. 26, 1912.
2 SHEETS—SHEET 2.
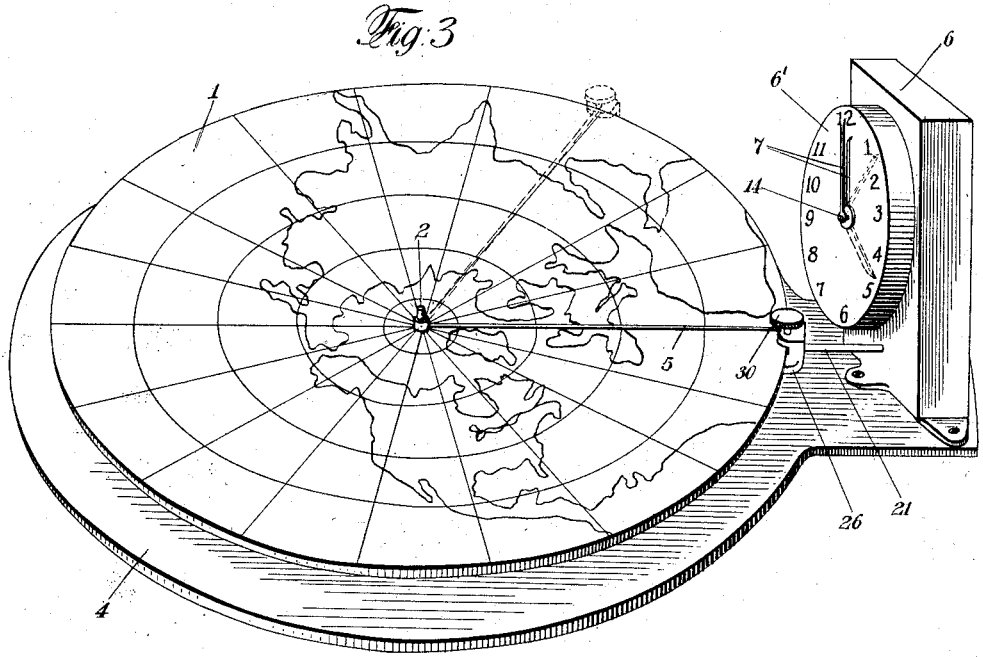
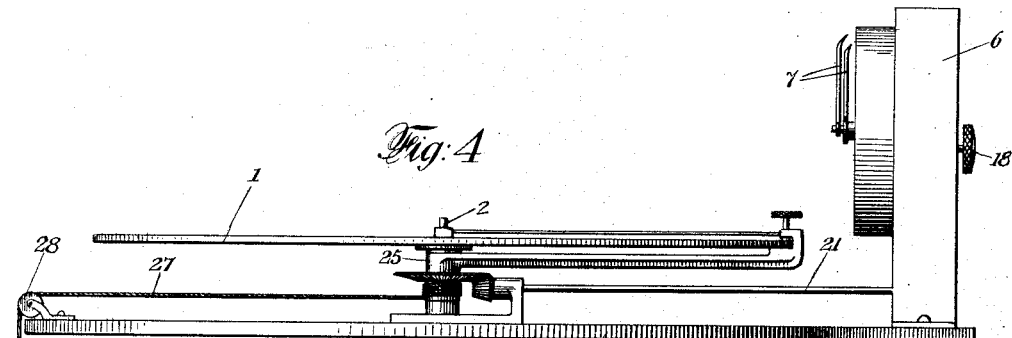

UNITED STATES PATENT OFFICE.

MARIO LUPORINI, OF NEW YORK, N. Y.

UNIVERSAL CLOCK.

1,045,304.  Specification of Letters Patent.  Patented Nov. 26, 1912.

Application filed March 20, 1912. Serial No. 685,053.

*To all whom it may concern:*

Be it known that I, MARIO LUPORINI, a subject of the King of Italy, residing at the borough of Manhattan, in the county of New York and State of New York, have invented certain new and useful Improvements in Universal Clocks, of which the following is a specification, reference being had therein to the accompanying drawings, forming part thereof.

My invention relates to universal clocks, and has for an object to provide a simple and reliable device by means of which the time at any point on the earth's surface may be readily and quickly ascertained.

In accordance with my invention, I employ a terrestrial chart or map of the earth's surface or a portion thereof, mounted to rotate on its polar axis, and combined therewith manually operative means for readily converting longitude into time, and vice versa.

More specifically, in my preferred construction the map is continuously rotated by a clock movement one complete rotation in every twenty-four hours.

My invention also includes various features of construction and combinations of parts, and has various other objects and advantages, as will hereinafter more fully appear.

I shall now describe the embodiments of my invention illustrated in the accompanying drawings, and shall thereafter point out my invention in claims.

Figure 1 is a longitudinal central sectional elevation of a complete device embodying my invention. Fig. 2 is a plan view of the same. Fig. 3 is a perspective view of the same. Fig. 4 is a view corresponding to Fig. 1, showing a modified embodiment of my invention.

In the embodiment of my invention illustrated in Figs. 1, 2 and 3, I employ a chart disk 1 containing a map or representation of a terrestrial hemisphere, shown as the northern hemisphere, with meridian lines radiating from its center or pole to its outer circle, representing the equator. This chart disk 1 is mounted for rotation about its central or polar axis, and for this purpose the disk is fixed to a central rotative arbor 2, which is supported in suitable bearings and is continuously rotated by clock-work 3 connected to its lower end and secured on the base 4 of the device. The parts are so designed that the disk is rotated one complete rotation in every twenty-four hours.

Pivoted at its inner end on the arbor 2 and extending radially outward therefrom over the face of the disk 1 is a meridian indicator 5 adapted for angular movement over the disk 1. To indicate the time at the successive places covered by the meridian indicator, I employ a universal time-indicator, comprising a clock-dial 6' and hands 7, the hands being operatively connected to the meridian indicator so that the movement of the meridian indicator about its pivot over the face of the chart will correspond to the movement of the time indicating hands of the time indicator, *i. e.*, one revolution of the meridian indicator to twenty-four hours of time indicated by the hands of the time indicator. These connecting means will now be described.

The universal time indicator is mounted on an extension of the base 4 at one side of the chart disk 1, and comprises a casing 6, in the front of which are the clock-dial 6' and hands 7 above referred to, and contained within the casing 6 is a manually operatable train of gears. This train of gears comprises a gear wheel 8 fixed on a transverse arbor or shaft 9 and meshing with a pinion 10 on an arbor 11, situated above and parallel with the arbor 9. On the arbor 11 near its front end is a gear wheel 12 which meshes with a pinion 13 on the minute-hand arbor 14. The hour-hand is driven through the pinion 15 on the arbor 11, and gear wheel 16 on the hour-hand sleeve 17, the ratio of movement between the hour- and minute-hands being twelve to one, as is usual. On the outer end of the arbor 9 is a hand knob 18, and it is apparent that a setting of the hands 7 about the clock-dial will be effected by the turning of the knob 18 through the train of gears just described. The outer or free end of the meridian indicator 5 is operatively connected to this universal time-indicator so that the turning of the knob 18 swings the outer or free end of the meridian indicator around at a rate of movement corresponding to that of the hour-hand. Fixed on the arbor 9 is a gear wheel 19, which meshes with a pinion 20 on a rod 21 extending from the case 6 underneath the chart disk 1 and having its inner bearing in a supporting bracket 22 on the top of the casing for the clock-work 3. On the inner end of this shaft 21 is a bevel pinion 23 which meshes with the bevel gear wheel 24 fixed to a sleeve 25 surrounding the arbor 2. This sleeve 25 carries an arm 26, which extends radially underneath the disk 1 and has an upwardly extending outer end fitting over the periphery of the disk 1. The outer or free end of the meridian indicator 5 is secured to the upper part of the arm 26 just above the chart disk. A clamp screw 30 enables the meridian indicator to be clamped to the chart disk when desired. It is apparent that, through these means, the turning of the hand knob 18 results in the angular movement of the meridian indicator 5 over the face of the disk 1 and a movement of the hands of the universal time indicator, and the ratio of gearing is such that the meridian indicator is moved at a rate of speed corresponding to that of the hands 7, and the meridian indicator is therefore moved through 360° or one complete rotation during two rotations of the hour-hand and twenty-four rotations of the minute-hand about the face of the clock-dial.

In the embodiments shown, the hands 7 and the meridian indicator 5 are so set that the meridian indicator extends in a radial line directly toward the center of the clock-dial, as shown in Fig. 2, when the hands 7 indicate twelve o'clock. When the operation of the device is initiated, with the meridian indicator 5 in the position shown in Fig. 2, the chart disk 1 is set so that the meridian line on the earth's surface at which it is exactly twelve o'clock is arranged underneath the meridian indicator 5 and the clock-work 3 is started. It is now apparent that, since the disk 1 is rotated by the clock-work at a rate of speed corresponding to the rotation of the earth upon its axis, it will always be exactly twelve o'clock at the meridian line underneath the meridian indicator 5. If now it should be desired to ascertain the time at any point on the earth's surface which is not underneath the meridian indicator, it is only necessary to manipulate the hand knob 18 and turn the meridian indicator 5 until it covers the point the time of which it is desired to learn, and the hands 7 will, in the meantime, have been turned through a corresponding movement and will indicate the time at that place.

The parts are so arranged that the meridian indicator 5 is moved toward the west as the hands are moved forward, and is moved toward the east as the hands are moved backward, in accordance with the fact that the time is progressively later as one proceeds toward the east. Suppose, for instance, it be desired to find the time at a point underneath the meridian indicator as shown in dotted lines in Fig. 3. The knob 18 is turned to the left and the meridian indicator 5 is thereby moved to the right until it occupies the position shown in dotted lines in Fig. 3. In the meantime, the clock hands 7 will have been moved through substantially four hours and seven minutes, as shown in dotted lines, thereby showing that it is seven minutes past four at all points along the meridian line corresponding with the meridian indicator in the position indicated by dotted lines. Similarly, had it been desired to ascertain at what points on the earth's surface it is seven minutes past four, this could have been ascertained by moving the meridian indicator and the hands of the universal time indicator until the hands reached the position indicated by dotted lines and then to have observed what line on the earth's surface was covered by the meridian indicator 5. So the difference in time between any two places on the earth's surface may be readily ascertained. In other words, by my device longitude is readily converted into time, and vice versa. If a continuous indication of the time at any part of the earth's surface is desired, it is only necessary to properly set the meridian indicator and clamp it to the chart disk in that position by means of the clamp screw 30. It will be obvious that a chart disk giving the map of the Southern Hemisphere may be employed when it is desired to ascertain the time of points in the Southern Hemisphere, or, since the Southern Hemisphere is less important than the Northern Hemisphere, the outline of the countries in the Southern Hemisphere may be drawn in on the same disk as that containing the Northern Hemisphere, but in a different color, and little or no confusion will result from such a superposition.

To prevent any lost motion or back lash in the movement of the parts due to the looseness of the gearing, with resultant inaccuracies of indications, a take-up device may be employed. In the illustrated embodiments, this is shown as a cord 27 secured at one end to the sleeve 25 and wound more or less around the sleeve and running over an anti-friction device such as a pulley 28 on the base 4 and provided with a weight 29 at its free end. This device takes up any play of the parts and holds the meridian indicator 5 steady and prevents it from oscillating so that its indications are always accurate.

In Fig. 4 I have shown a modified embodiment of my invention, in which the clock-work 3 for rotating the disk 1 is omitted and in which the disk 1 may be freely rotated upon its axis by hand. With such a device, the difference in time between any two points may be readily ascertained. Supposing, for example, that the meridian indicator 5 is in the position shown in Fig. 2, the disk 1 may be rotated so as to bring one of the points in question underneath the meridian indicator 5, and then by manipulating the hand knob 18, the meridian indicator 5 may be moved until it covers the other point in question, and the difference in time noted on the time indicator. Also, noting the time at any point on the earth's surface, it is an easy matter to determine the time at any other point with such a device. To do this, one has only to set the hands of the time indicator to indicate the known time, and then the disk 1 may be rotated so as to bring underneath the point at which the time is known the meridian indicator 5, when the meridian indicator may be rotated so as to cover the other point in question, and it is apparent that the hands of the time indicator will then denote the time at this latter place.

It will be understood that the meridian indicator 5 will be turned from west to east to ascertain the time of any point west of the meridian of Greenwich, and from east to west to determine the time of any point east of the meridian of Greenwich.

It will be readily seen that, by means of my improved universal clock, both the astronomical and standard time of any place on the earth may be readily ascertained, and from a time ascertainment the longitude may be determined without calculation, and many geographical and astronomical facts may be clearly and easily demonstrated.

It is obvious that various modifications may be made in the construction shown and above particularly described within the principle and scope of my invention.

I claim:

1. A universal clock mechanism comprising a terrestrial chart mounted upon a central polar axis, a meridian indicator angularly movable over the chart on the said axis, a manually operative universal time indicator adapted to indicate successive intervals of time, and means operatively connecting the time-indicator to the meridian indicator so that the meridian indicator makes a complete rotation while the time-indicator is traversing the twenty-four hours.

2. A universal clock mechanism comprising a terrestrial chart mounted for rotation about a polar axis, a meridian indicator angularly movable over the chart on the said axis, a universal time indicator, means operatively connecting the time-indicator to the meridian indicator so that the meridian indicator makes a complete rotation while the time-indicator is traversing twenty-four hours, and a clock mechanism arranged to rotate the chart one complete rotation in every twenty-four hours.

3. A universal clock mechanism comprising a terrestrial chart mounted upon a central polar axis, a meridian indicator angularly movable over the chart on the said axis, a manually operative time indicator adapted to indicate successive intervals of time, means operatively connecting the time indicator and meridian indicator whereby movement of one is imparted to the other at corresponding speed, a clock mechanism arranged to rotate the chart one complete rotation in every twenty-four hours, and means for clamping the meridian indicator to the chart.

4. A universal clock mechanism comprising a terrestrial chart disk mounted for rotation upon an axis coincident with its pole, a meridian indicator angularly movable over the chart disk on the said axis, a clock-dial, hands for the clock-dial, manually operative means for rotating the hands over the clock-dial to the various indications of time, and means operated by the manually operative means for moving the meridian indicator over the chart disk at a rate of movement corresponding to that of the hands over the clock-dial, whereby the meridian indicator makes a complete rotation while the hands are traversing twenty-four hours on the clock-dial.

5. A universal clock mechanism comprising a terrestrial chart mounted for rotation about a polar axis, a meridian indicator angularly movable over the chart on the said axis, a clock-dial, hands for the clock-dial, means connecting the meridian indicator and the hands so that the meridian indicator makes a complete rotation while the hands are traversing twenty-four hours on the clock-dial, and a clock mechanism arranged to rotate the chart one complete rotation in every twenty-four hours.

6. A universal clock mechanism comprising a terrestrial chart disk mounted for rotation upon an axis coincident with its pole, a meridian indicator angularly movable over the chart disk on the said axis, a clock-dial, hands for the clock-dial, manually operative means for rotating the hands over the clock-dial to the various indications of time, means operated by the manually operative means for moving the meridian indicator over the chart disk at a rate of movement corresponding to that of the hands over the clock-dial, whereby the meridian indicator makes a complete rotation while the hands are traversing twenty-four hours on the clock-dial, and a clock mechanism arranged to rotate the chart disk one complete rotation in every twenty-four hours.

7. A universal clock mechanism comprising a chart disk representing a terrestrial hemisphere and mounted for rotation upon an axis coincident with its pole a meridian indicator angularly movable over the chart disk on the said axis, a clock-dial, hands for the clock-dial, means connecting the meridian indicator and the hands so that the meridian indicator makes a complete rotation while the hands are traversing twenty-four hours on the clock-dial, a clock mechanism arranged to rotate the chart disk a complete rotation in every twenty-four hours, and a take-up device operative to take up lost motion of the meridian indicator.

8. A universal clock mechanism comprising a chart disk representing a terrestrial hemisphere and mounted for rotation upon an axis coincident with its pole, a meridian indicator radially extending from the pole and angularly movable over the disk on the said axis, a clock-dial, hands for the clock-dial, a train of gears operative to move the hands over the clock-dial to the various indications of time, means for manually operating the train of gears, and means operatively connected to the train of gears for moving the meridian indicator over the disk at a rate of movement corresponding to that of the hands over the clock-dial, whereby the meridian indicator makes a complete rotation while the hands are traversing twenty-four hours on the clock-dial.

9. A universal clock mechanism comprising a chart disk representing a terrestrial hemisphere and mounted for rotation upon an axis coincident with its pole, a meridian indicator radially extending from the pole and angularly movable over the disk on the said axis, a clock-dial, hands for the clock-dial, a train of gears operative to move the hands over the clock-dial to the various indications of time, means for manually operating the train of gears, means operatively connected to the train of gears for moving the meridian indicator over the disk at a rate of movement corresponding to that of the hands over the clock-dial, whereby the meridian indicator makes a complete rotation while the hands are traversing twenty-four hours on the clock-dial, and a clock mechanism arranged to rotate the chart disk one complete rotation in every twenty-four hours.

10. A universal clock mechanism comprising a chart disk representing a terrestrial hemisphere and mounted for rotation upon an axis coincident with its pole, a meridian indicator radially extending from the pole and angularly movable over the disk on the said axis, a clock-dial, hands for the clock-dial, a train of gears operative to move the hands over the clock-dial to the various indications of time, means for manually operating the train of gears, means operatively connected to the train of gears for moving the meridian indicator over the disk at a rate of movement corresponding to that of the hands over the clock-dial, whereby the meridian indicator makes a complete rotation while the hands are traversing twenty-four hours on the clock-dial, a clock mechanism arranged to rotate the chart disk one complete rotation in every twenty-four hours, and a take-up device operative to take up lost motion of the meridian indicator.

11. A universal clock mechanism comprising a terrestrial chart mounted upon a central polar axis, a clock mechanism arranged to rotate the chart on its axis one complete rotation in every twenty-four hours, a meridian indicator movable with the chart, and a time indicator operatively coupled to the meridian indicator to move therewith at a corresponding rate of speed.

In testimony whereof I have affixed my signature in presence of two witnesses.

MARIO LUPORINI.

Witnesses:
VICTOR D. BORST,
BERNARD COWEN.

---

Copies of this patent may be obtained for five cents each, by addressing the "Commissioner of Patents, Washington, D. C."